350-370 SR
XR 3,202,828
SEARCH ROOM

Aug. 24, 1965 WU CHEN 3,202,828

USE OF POLARIZING MATERIALS TO OVERCOME LIGHT LEAKAGE

Filed July 2, 1962

INVENTOR.
WU CHEN
BY *Louis Altman*
ATTORNEY

3202828
OR IN 250/225

United States Patent Office 3,202,828

Patented Aug. 24, 1965

3,202,828

USE OF POLARIZING MATERIALS TO OVERCOME LIGHT LEAKAGE

Wu Chen, Norwalk, Conn., assignor to Sperry Rand Corporation, New York, N.Y., a corporation of Delaware Filed July 2, 1962, Ser. No. 206,925

5 Claims. (Cl. 250—225)

This invention relates to optical sensing, particularly as it is employed in the sensing of perforated data records such as tabulating cards or punched tape.

Information recorded in the form of holes punched in such records can be read by shining thereon light or other radiation to which the record is substantially opaque. If a hole is punched in the record at the place where the beam of radiation strikes, substantially all the radiation passes through the hole and the resulting high level of illumination can be sensed and interpreted as an indication of the presence of the hole. If there is no hole at the place where the beam strikes, the illumination is substantially blocked and the resulting low level of illumination is sensed and interpreted as an indication of the absence of a hole. In other areas of the technology, such as edge-sensing of perforated records or other objects, when the edge of the object is interposed in the path of the radiation it too can be sensed by means of the resulting reduction in illumination level.

But in such applications a problem arises whenever the object sensed is not perfectly opaque to the radiation employed. This is often the case when the object is a thin sheet; the term "sheet" being used here and in the appended claims to include any substantially planar object such as a tabulating card, perforated tape, a paper web which is edge-sensed, and the like. For example, where visible light is employed to sense a standard tabulating card (thickness 0.007 of an inch) there is often a small amount of light leakage through the thin, slightly translucent body of the card. Such light leakage may also occur in other situations, as for example where edge-sensing techniques are employed in connection with thin, slightly translucent paper webs. In either case the leakage radiation constitutes background "noise" which increases the difficulty of distinguishing a true "signal" level of illumination.

Accordingly, it is broadly an object of this invention to provide an improved optical sensing device. Specifically, it is intended to improve the accuracy and reliability of such devices through an increase in the signal-to-noise ratio. A further object is to reduce the criticality of design requirements for the sensing circuitry employed in such devices.

These objects may be achieved by making use of the properties of polarizing materials. Whenever a beam of unpolarized radiation is passed through a polarizing filter, the beam is not only polarized but is also substantially reduced in intensity. This is because the filter polarizes by blocking out whatever component of the radiation is not parallel to the polarization axis of the filter. If the original unpolarized beam is of equal amplitude in all directions, as much as half the intensity of the beam will be lost, depending on the efficiency of the polarizing filter. But if the beam is already polarized, the degree of reduction in intensity may be considerably greater or less, depending on the angle between the polarization plane of the beam and the axis of the filter. Therefore a polarizing filter can be used to distinguish polarized from unpolarized radiation according to the changes in intensity which the filter causes.

This becomes useful in optical sensing because of the fact that leakage radiation transmitted through an imperfectly opaque material is unpolarized. Even if the radiation was originally polarized, passage through such material depolarizes it; i.e. causes it to emerge in a state of substantially random organization. Thus, in accordance with this invention, there is provided apparatus for optical sensing of a sheet, in which the signal illumination is initially polarized, and is subsequently treated according to whether it has remained polarized, an indication that the radiation beam has not been interrupted, or has been randomized, which would indicate transmission through sheet material. Such apparatus includes a pair of filters interposed across a radiation path, each adapted to polarize radiation traveling along the path. The filters are spaced apart to permit the sheet to be interposed across the radiation path at a selected location between the filters. One of the filters thus polarizes radiation incident upon the selected location. At least part of this polarized radiation then passes through the selected location and thereafter strikes the other filter. The axes of polarization of the filters are so arranged that the proportion of the radiation incident upon the other filter which is transmitted therethrough depends upon whether such radiation has been depolarized by transmission through sheet material present at the selected location or has retained its polarization on passing through the selected location when it is unoccupied by sheet material. For example, the other filter may be oriented so as to pass direct illumination while blocking leakage illumination; or it may be oriented to do the opposite. Finally, means are provided for sensing the intensity of radiation passing through the filters and the selected location to determine the presence or absence of sheet material at that location.

The features and objects briefly summarized above will now be fully explained in the following detailed description, in conjunction with the accompanying drawings in which.

Figure 1:
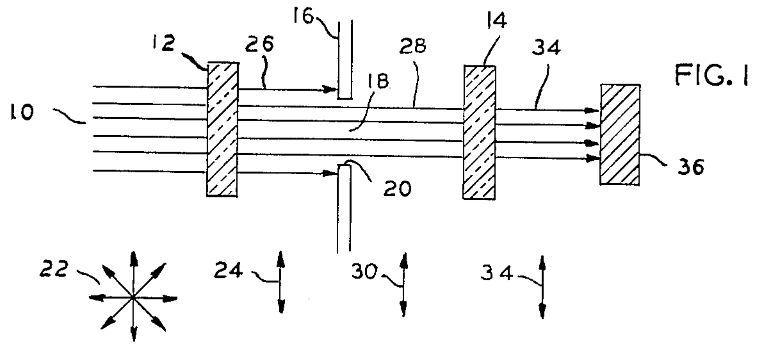
FIG. 1 is a ray diagram showing the passage of radiation in a sensing device in accordance with this invention when sensing a hole punched in a sheet, together with an auxiliary diagram indicating the polarization state of the radiation at various key locations along its path.

Referring specifically to the drawings, FIG. 1 shows radiation such as rays 10 of visible light directed along the path indicated by any conventional light source (not shown). A pair of polarizing filters 12 and 14 are interposed across the light path to polarize this radiation. The term "filter" is used here in the sense of any transparent or translucent material which is capable of selective transmission of radiation. The particular type of filter employed is the kind which discriminates according to the direction of polarization of the radiation rather than according to its wavelength as in the case of color filters. An example of a suitable material is that which is available commercially under the name "Polaroid." The polarizing filters 12 and 14 are spaced apart in order to allow room for a sheet, such as a tabulating card 16, to be interposed across the light path at a selected location 18. This may be accomplished by any conventional card-handling machinery (not shown).

In the example illustrated in FIG. 1, there is a hole 20 punched in the tabulating card 16 at the selected location 18. The initial rays 10 are not polarized. The sets of arrows along the bottom edge of each drawing indicate the various transverse orientations present in the respective light rays immediately above the arrows. Thus the initial rays 10 are oriented randomly in all directions, as indicated by arrows 22. But the filter 12 (within the limits of its efficiency) blocks those components of the rays 10 which are not oriented parallel to its axis of polarization. In the example shown, that axis is oriented vertically.

Therefore, as indicated by the arrow 24, the transmitted rays 26 emerging from the filter 18 are those which are polarized vertically. As indicated by arrow 30, the light beam remains so polarized as the continuing rays 28 pass through the hole 20 and strike the second polarizing filter 14. In this embodiment of the invention, the second filter 14 is oriented with its axis of polarization parallel to that of the first filter 12; i.e. vertical. Therefore the vertically polarized rays 28 which strike the second filter 14 are transmitted through that filter as rays 32, without suffering any large change in polarization (note arrow 34) or any large reduction in intensity. After emerging from the filter 14, the transmitted rays 34 strike a semiconductor photocell 36 which senses the intensity of the illumination. The photocell 36 is connected to conventional sensing circuitry (not shown) which then interprets the level of illumination passing through the filter 14 as an indication of the presence of the hole 20.

It will be realized that the intensity of the rays 10 is nearly halved by the first filter 12, since it achieves vertical polarization by blocking nearly all of the radiation represented by the horizontal arrow in group 22 and nearly the entire horizontal component of that represented by the diagonal arrows of the group, while passing only the radiation represented by the vertical arrow plus the vertical component of that represented by the diagonal arrows. However, the resulting reduction in intensity of the signal illumination reaching the photocell 36 is compensated for by designing the aforesaid sensing circuitry to trigger a hole recognition at an appropriately lower signal level than would be obtained in the absence of the first filter 12. The important fact to notice is that in the example of FIG. 1 the second filter 14 does not make any significant further reduction in the intensity of the signal illumination, because of the fact that the rays 28, when they strike the filter 14, are already polarized in the plane in which that filter has its polarizing effect.

Figure 2:
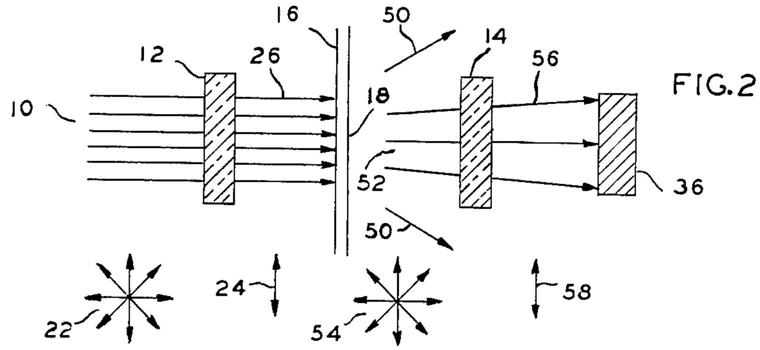
FIG. 2 is a similar ray and polarization diagram illustrating the case where no hole is sensed.

In FIG. 2 the initial rays 10 are once again unpolarized, as indicated by arrows 22, and the emerging rays 26 are again vertically polarized by the first filter 12, as indicated by the arrow 24. In the case illustrated by FIG. 2, however, the card 16 does not have a hole 20 punched therein at the selected location 18. As a result, the substantially opaque card material present at that location blocks most of the signal illumination represented by rays 26. However, such a card is not perfectly opaque; i.e. it is sufficiently translucent to transmit the incident illumination 26 as weak rays 50, 52 of leakage light, some of which, such as the rays 52 strike the photocell 36 and are sensed thereby to generate a low level spurious signal even though no hole is punched in the selected card location 18. The sensing circuitry to which the photocell 36 is connected must then discriminate critically between this low noise level and the higher signal level generated when full strength illumination passes through the hole 20. Increasing the ratio of this signal level to that of the leakage noise therefore results in greater accuracy and reliability of discrimination, and permits a lowering of the criticality of the design requirements for the sensing circuitry.

The leakage illumination 52 which is transmitted in the direction of the photocell 36 is prevented from striking the photocell by the second filter 14. Unlike the polarized direct radiation 28 passing through the hole 20 in FIG. 1, the leakage radiation 52 is disorganized by its transmission through the card material and thus emerges with a random organization, as indicated by the arrows

54 of the polarization diagram. In effect, the leakage light 52 is depolarized. Therefore, when this leakage light subsequently passes through the second filter 14 it suffers the same attenuation that any beam of unpolarized light would suffer; i.e. nearly a one half reduction in intensity resulting from the blocking of nearly all of the horizontal component. The remaining leakage radiation 56 which passes the second filter is little more than the half which is vertically polarized, as indicated by arrow 58. Thus the amount of leakage 56 ultimately reaching the photocell 36 to generate noise is cut very sharply. Yet, as will be recalled from the discussion of FIG. 1, nearly all of the signal light passing through the hole 20 passes through the second filter 14 to reach the photocell 36. Thus it is seen that this arrangement discriminates between signal and leakage radiation, allowing a greater fraction of the total available signal to be sensed than of the total available leakage. The result, in terms of light actually sensed, is a two-fold increase in the signal-to-noise ratio, with its attendant advantages of enhanced performance and relaxation of design requirements.

Figure 3:
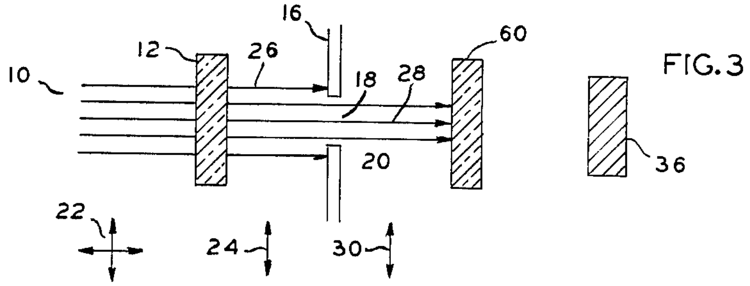
FIG. 3 is a similar set of diagrams illustrating the sensing of a hole by means of an alternative embodiment in accordance with this invention; and, FIG. 4 is a similar set of diagrams covering the case where no hole is sensed by the device of FIG. 3.
Figure 4:
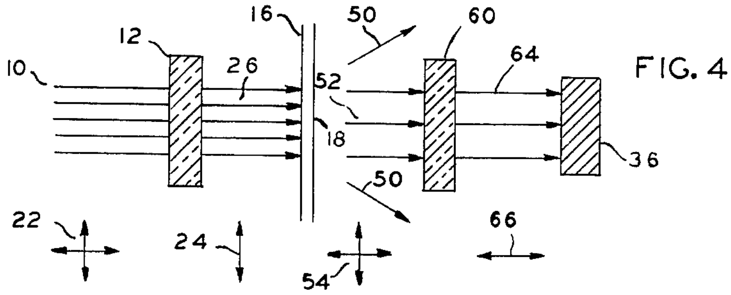

In the embodiment of FIGS. 3 and 4 the same first polarizing filter 12 is used, with its axis of polarization again oriented, for example, vertically. But in place of the filter 14 (FIGS. 1 and 2), with its axis of polarization parallel to that of the first filter 12, there is provided a second polarizing filter 60 which is oriented with its axis of polarization at right angles to that of the first filter 12 (i.e. horizontally in the example given. FIG. 3, in the manner of FIG. 1, illustrates the case where a hole 20 is punched in the selected location 18 of the card 16. Again, the initial illumination 10 approaching the first filter 12 is unpolarized (arrows 22), and transmitted rays 26 emerging from the first filter 12, are polarized vertically (arrow 24), as are (arrow 30) the continuing rays 28 passing through the hole 20. But when these vertically polarized rays 28 strike the horizontally polarizing filter 60, they are almost completely blocked; substantially no light is transmitted through the second filter 60 to the photocell 36. Thus in this embodiment darkness, instead of illumination, is the indication that there is a hole 20 in the card area 18.

FIG. 4 illustrates the functioning of this embodiment when there is no hole 20 in the card area 18. Once again the rays 10 incident upon the first polarizing filter 12 are unpolarized (arrows 22), and the transmitted rays 26 emerging from the filter 12 to strike the card 16 are polarized (arrow 24). Once again, as in FIG. 2, some of the leakage light 50 passing through the card 16 is scattered, and the rest of the leakage 52 is directed toward the second filter 60. This leakage is again unpolarized, as indicated by arrows 54.

Thus the second polarizing filter 60 does not block almost the entire beam, as it does in the case illustrated by FIG. 3. Instead it only halves the intensity by blocking the vertically polarized half. The other half (rays 64, horizontally polarized as shown by arrow 66) is transmitted through the filter 60 to reach the photocell 36 where it is sensed as an indication of the absence of a hole at the selected card location 18. Thus once again there is a selective action which serves to discriminate between the polarized direct radiation 28 and the unpolarized leakage 52. Of course the "signal" (in this instance the leakage 52) is attenuated and thus the sensing circuitry must be designed and adjusted to trigger a recognition at the low level of illumination remaining after the original light has been reduced in intensity by the card 16 and both of the filters 12 and 60. But as long as the card 16 is interposed to depolarize some light as in FIG. 4, enough illumination gets through the filter 60 to act as a signal; whereas in the absence of the card material at location 18 (FIG. 3) almost none gets through to generate noise. In addition, this embodiment is useful even in some applications where the material to be sensed is more highly translucent, since the only requirement is that the material depolarize the leakage light 52 which is transmitted therethrough.

The foregoing illustrates preferred ways of practicing this invention; but since there may be countless other specific applications of the same principles, the scope of protection is not limited to any particular examples but is defined more generally in the appended claims.

The invention claimed is:

1. An optical record-sensing device comprising:

(a) a radiation source, the radiation from said source being directed along a path;

(b) a record member having perforated and non-perforated areas at a selected location wherein said non-perforated areas are partially transparent, said path of radiation from said source being directed at said selected location of said record member;

(c) a first plane polarizing means interposed between said radiation source and said partially transparent record member, said first plane polarizing means being oriented adjacent said radiation source to receive energy radiation from said source, said first plane polarizing means being further oriented adjacent said record member;

(d) a sensing means to detect the intensity of radiation along said path;

(e) a second plane polarizing means interposed between said record member and said sensing means, said second plane polarizing means being oriented across said path of radiation, the axes of polarization of said first and second plane polarizing means being so arranged that the proportion of the radiation transmitted to said sensing means from said second plane polarizing means depends upon whether such plane polarized radiation has been depolarized by transmission through said partially transparent, non-perforated area at said selected location of said record member, or has retained its plane polarization on passing through said perforation formed in said record member at said selected location.

2. An optical record-sensing device comprising:

(a) a radiation source, the radiation from said source being directed along a path;

(b) a record member having perforated and non-perforated areas at a selected location wherein said non-perforated areas are partially transparent, said path of radiation from said source being directed at said selected location of said record member;

(c) a first plane polarizing means interposed between said radiation source and said record member, said first plane polarizing means being oriented adjacent said radiation source to receive energy radiation from said source, said plane polarizing means being further oriented adjacent said record member;

(d) a sensing means to detect the intensity of radiation along said path;

(e) a second plane polarizing filter interposed between said record member and said sensing means, said second plane polarizing means being oriented across said path of radiation, the axes of polarization of said first and second plane polarizing filters being oriented substantially parallel so that depolarized leakage radiation from said partially transparent non-perforated area at said selected location of said record member is repolarized by said second plane polarizing filter to substantially reduce its intensity upon reaching said sensing means, whereas plane polarized radiation passing through said perforation formed at said selected location of said record member is relatively unaffected by said second plane polarizing filter upon reaching said sensing means.

3. An optical record-sensing device comprising:

(a) a radiation source, the radiation from said source being directed along a path;

(b) a record member having perforated and non-perforated areas at a selected location wherein said non-perforated areas are partially transparent, said path of radiation from said source being directed at said selected location of said record member;

(c) a first plane polarizing means interposed between said radiation source and said record member, said first plane polarizing means being oriented adjacent said radiation source to receive radiation from said source, said first plane polarizing means being further oriented adjacent said record member;

(d) a sensing means to detect the intensity of radiation along said path;

(e) a second plane polarizing means interposed between said record member and said sensing means, said second plane polarizing means being oriented across said path of radiation, the axes of polarization of said first and second plane polarizing means being substantially at right angles to one another so that leakage radiation from said partially transparent non-perforated area at said selected location is partially transmitted by said second plane polarizing means to said sensing means, whereas plane polarized radiation passing through said perforation formed in said record member at said selected location is blocked by said second plane polarizing filter.

4. An optical record-sensing device comprising:

(a) a radiation source, the radiation from said source being directed along a path;

(b) sensing means to detect the intensity of radiation along said path;

(c) a partially transparent record member disposed at a selected location across said path of said radiation from said radiation source, said selected location of said record member providing a perforation or an absence of a perforation;

(d) a first plane polarizing filter means having an axis of polarization interposed between said radiation source and said partially transparent record member wherein plane polarized radiation emanating from said first filter impinges directly upon said selected location of said record member;

(e) a second plane polarizing filter means having an axis of polarization disposed across said radiation path and interposed between said partially transparent record member and said sensing means, said axes of polarization of said first and second polarizing filter means being arranged so that the amount of plane polarized radiation detected by said sensing means during the presence of a perforation in said partially transparent record member is at a maximum and the amount of plane polarized radiation detected by said sensing means during the absence of a perforation in said partially transparent record member is at a minimum.

5. An optical record-sensing device comprising:

(a) a radiation source, the radiation from said source being directed along a path;

(b) a record member having perforated and non-perforated areas at a selected location, said non-perforated areas being partially transparent;

(c) a first plane polarizing means interposed between said radiation source and said record member, said first plane polarizing means being oriented across said path of radiation to plane polarize said radiation, said first plane polarizing means further being oriented adjacent said radiation source as well as adjacent said record member;

(d) a sensing means to detect the intensity of said radiation along said path;

(e) a second plane polarizing means interposed between said record member and said sensing means, said second plane polarizing means being oriented across said path of radiation, the axes of polarization of said first and second plane polarizing means being arranged substantially parallel so that said plane polarized radiation from said first plane polarizing means after passing through said perforated area at said selected location of said record member is transmitted to said sensing means substantially unattenuated, whereas the plane polarized radiation from said first plane polarizing means is attenuated by said partially transparent non-perforated area at said selected location of said record member upon reaching said sensing means.

References Cited by the Examiner

UNITED STATES PATENTS

| | | | |
|---|---|---|---|
| 2,777,069 | 1/57 | Saeman | 250—225 X |
| 3,027,806 | 4/62 | Koelsch et al. | 250—225 X |
| 3,068,362 | 12/62 | Rucchio et al. | 250—219 X |

RALPH G. NILSON, *Primary Examiner.*

WALTER STOLWEIN, *Examiner.*